United States Patent
Friesen et al.

(10) Patent No.: US 12,389,231 B2
(45) Date of Patent: Aug. 12, 2025

(54) METHOD FOR SECURING COMMUNICATION BETWEEN A COMMUNICATION SYSTEM OF A VEHICLE AND A VEHICLE-EXTERNAL SERVER

(71) Applicant: MERCEDES-BENZ GROUP AG, Stuttgart (DE)

(72) Inventors: Viktor Friesen, Karlsruhe (DE); Viktor Pavlovic, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 267 days.

(21) Appl. No.: 18/275,253

(22) PCT Filed: Jan. 17, 2022

(86) PCT No.: PCT/EP2022/050824
§ 371 (c)(1),
(2) Date: Aug. 1, 2023

(87) PCT Pub. No.: WO2022/167201
PCT Pub. Date: Aug. 11, 2022

(65) Prior Publication Data
US 2024/0121615 A1    Apr. 11, 2024

(30) Foreign Application Priority Data
Feb. 2, 2021    (DE) .................... 10 2021 000 522.8

(51) Int. Cl.
*H04W 12/60*    (2021.01)
*G07C 5/00*    (2006.01)
*G06F 8/65*    (2018.01)

(52) U.S. Cl.
CPC ............ *H04W 12/60* (2021.01); *G07C 5/008* (2013.01); *G06F 8/65* (2013.01)

(58) Field of Classification Search
None
See application file for complete search history.

(56) References Cited

U.S. PATENT DOCUMENTS 9,660,978 B1 * 5/2017 Truskovsky ........ H04L 63/0823
11,295,017 B2    4/2022 Madrid et al.
(Continued)

FOREIGN PATENT DOCUMENTS

| DE | 102009037193 B4 | 10/2016 |
| DE | 102018101856 A1 | 8/2018 |
| DE | 102020001199 A1 | 8/2021 |
| JP | 2020010396 A | 1/2020 |

(Continued)

OTHER PUBLICATIONS

Bernstein, D., Lange, T. Post-quantum cryptography. Nature 549, 188-194 (2017). (Year: 2017).*

(Continued)

*Primary Examiner* — Paul R Fisher
(74) *Attorney, Agent, or Firm* — PATENT PORTFOLIO BUILDERS PLLC

(57) ABSTRACT

Communications between a communication system of a vehicle and an external server external via a communication interface are secured such that data is transmitted to the communication system with integrity and authenticity protection, and also confidentially where necessary. A first securing method for the non-post-quantum-resistant securing of exchanged data is implemented, a second securing method for the post-quantum-resistant securing of exchanged data is implemented or is able to be implemented. Key material for the second securing method is initially introduced in the communication system and is stored securely or is able to be introduced via a further interface with cryptographic encryption and is securely stored for exclusive use in the second securing method.

9 Claims, 1 Drawing Sheet

(56) References Cited

U.S. PATENT DOCUMENTS

Figure 1:
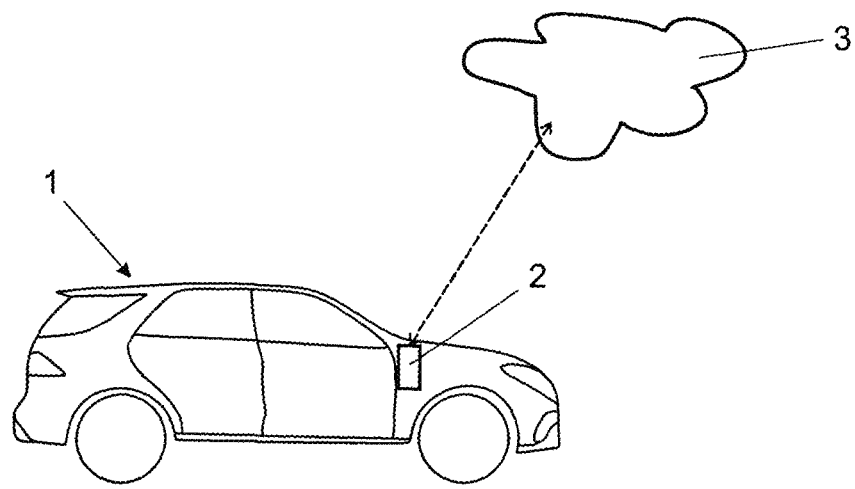

| | | | |
|---|---|---|---|
| 2012/0045055 A1* | 2/2012 | Fujita | H04L 63/0428 |
| | | | 380/255 |
| 2018/0217828 A1* | 8/2018 | Madrid | H04L 9/3247 |
| 2021/0006417 A1* | 1/2021 | Pala | H04L 9/3247 |
| 2021/0306145 A1* | 9/2021 | Krauthamer | H04L 9/0852 |

FOREIGN PATENT DOCUMENTS

| | | | |
|---|---|---|---|
| WO | 2020087152 A1 | 5/2020 | |
| WO | 2021014125 A1 | 1/2021 | |

OTHER PUBLICATIONS

Barreto et al.; "qSCMS: Post-quantum certificate provisioning process for V2X;" IACR Cryptol. ePrint Arch.; 2018; http://eprint.iacr.org/2018/1247.pdf.

International Search Report and Written Opinion mailed Apr. 19, 2022 in related/corresponding International Application No. PCT/EP2022/050824.

Office Action created Oct. 28, 2021 in related/corresponding DE Application No. 10 2021 000 522.8.

Vodafone; "pCR to TR 33.899: Quantum safe cryptography solutions;" 3GPP TSG WG3 (Security) Meeting #85; 33-161893; Nov. 7-11, 2016; Tenerif, ES.

Office Action dated Feb. 19, 2025 in related/corresponding KR Application No. 1020237025177.

Office Action dated Sep. 3, 2024 in related/corresponding JP Application No. 2023-544638.

Office Action dated Jan. 4, 2024 in related/corresponding EP Application No. 22 703 282.8.

* cited by examiner

METHOD FOR SECURING COMMUNICATION BETWEEN A COMMUNICATION SYSTEM OF A VEHICLE AND A VEHICLE-EXTERNAL SERVER

BACKGROUND AND SUMMARY OF THE INVENTION

Exemplary embodiments of the invention relate to a method for securing communication between a communication system of a vehicle and a vehicle-external server via a communication interface.

It is generally the case that modern vehicles, and in particular passenger cars and commercial vehicles, are part of a large vehicle ecosystem. A central part of this ecosystem is the so-called backend. This is a vehicle-external server that is usually operated by the vehicle manufacturer. The vehicles are connected to this vehicle-external server via the internet. The communication between this backend and the vehicles is typically secured via cryptographic methods in order to preserve the privacy of the vehicle user on the one hand and, on the other, to ensure that no external access to the data traffic is enabled which, in particular when data that relates to vehicle control is transmitted, could be used by hackers to attack the vehicles and manipulate important functions.

Current practice is to use methods based on asymmetrical cryptography. These methods are typically used in the form of TLS (Transport Layer Security), and sometimes IPSec (Internet Protocol Security), which themselves use conventional asymmetrical methods, e.g., RSA or ECC (Elliptic Curve Cryptography), which are based on prime number analysis.

The patent DE 10 2009 037 193 B4 describes a communication system 2 and a method for carrying out an exchange of such an asymmetrical key between a vehicle and a vehicle-external server to operate the data connection in a correspondingly cryptographically secured manner, and thus with encryption and/or authentication.

US 2012/0045055 A1 shows a communication device that enables two different cryptographic modes. It is possible to switch between these modes via a unit for switching the cryptographic modes back and forth. The disclosure does not produce any relationship with a vehicle ecosystem.

US 2018/0217828 A1 shows the encrypted communication between a vehicle and a vehicle-external server.

The typically-used asymmetrical cryptographic methods, e.g., ECC or RSA have the advantage that they offer a relatively secure securing with minimized effort according to the current state of the art. All these methods, however, are based on cryptographic algorithms, the security of which is not seen as robust with regard to quantum computers. Quantum computers are able to crack asymmetrical cryptographic methods and to decrypt secured data within a very short amount of time by the way in which they make calculations. The methods of cryptographic security typically used for communication between the vehicle and the backend, and thus in particular for encryption and/or authentication, are thus no longer secure. This so-called post-quantum threat was until now a more theoretical threat, as quantum computers were still considered pure research instruments and could only be realized with very high financial expenditure. In the last few years, however, the development of quantum computers has significantly accelerated. From a current perspective however, it is no longer possible to make a reliable prediction that sufficiently high-performing quantum computers will not be commercially available on the market in the next ten years.

Vehicles that come onto the market today will generally be on the road for 10 to 15 years. This means that the post-quantum threat, and thus the potential possibility of easily cracking the conventional asymmetrical cryptographic security via quantum computers easily or in particular commercially available at a later point in time is already relevant for vehicles to be delivered today. The communication of a communication device of the vehicle with the external server that is secured via cryptographic protocols that are currently mostly based on RSA or ECC would thus no longer be secure when this post-quantum threat is posed, such that secure communication over the entire operating duration of the vehicles to be expected cannot be guaranteed from a current perspective.

To meet the post-quantum threat, asymmetrical algorithms that are resistant to the post-quantum threat have been generally researched for several years. These are the approaches generally described as post-quantum cryptography or PQC. These approaches are not yet so mature, however, that they are currently suitable to replace the conventional methods. Current vehicles thus cannot yet be conceived with post-quantum-capable asymmetrical cryptographic methods, as these kinds of techniques are not yet so mature that it is possible to come to a conclusive verdict on the security to be expected. Additionally, there has been no standardization as yet and the approaches have a high resource requirement. A pre-emptive switch to such quantum computer-resistant cryptographic methods is thus neither advisable nor even possible at the present time. If there were already a PQC method seen as sufficiently secure, such a system also could not be sensibly integrated into the current communication devices of vehicles, as higher costs and an increased use of resources conflicts with economic viability in the current vehicle ecosystem.

It is further the case that symmetrical methods, e.g., AES (Advanced Encryption Standard) or hash methods, e.g., SHA-512 (Secure Hash Algorithm), or symmetrical authentication methods, e.g., HMAC (Hashed Message Authentication Code) are fundamentally affected by the post-quantum threat according to current knowledge. According to current knowledge, the security of these methods would still be halved by the introduction of the post-quantum threat, such that a 128-bit key would still deliver a 64-bit security after quantum computers became available. Such a weakness can however be relatively easily balanced out by increased key lengths.

An older, unpublished German application having the file number 10 2020 001 199.3 of the applicant shows a communication device and a method for cryptographically securing communication. Two explicit modes are described, a pre-quantum mode and a post-quantum mode. In the pre-quantum mode, conventional asymmetrical cryptographic methods are used, in the post-quantum mode correspondingly only post-quantum resistant methods. The mode the system is in is shown via a binary value that is unchangeably stored in a correspondingly secured memory, which can for example be designed as a write once memory (WOM).

Exemplary embodiments of the present invention are directed to a method for securing communication between a communication system of a vehicle and a vehicle-external server that continues to guarantee secure communication in the event of the introduction of the post-quantum threat.

The introduction of the post-quantum threat itself is naturally a barely tangible event. In the context of the method according to the invention, the post-quantum threat should thus be understood to mean e.g., an action triggered by a vehicle-external server that is triggered if e.g., it is determined by a vehicle manufacturer, by an authority or the like that pre-quantum-resistant methods could soon no longer be secure. In this case, the era of the post-quantum threat can be started for all vehicles connected to the server via such an action, e.g., setting a flag, initiating a software update or the like.

The method according to the invention uses, substantially as in the older unpublished German application specified above, a first securing method for the non-post-quantum securing of exchanged via a communication interface, the communication interface being implemented in the communication system, and thus typically represents the current delivery condition. To combat the issue that no assured findings with regard to post-quantum-resistant security currently exist, such a method is not necessarily implemented in the communication system, although this is also possible, and instead the possibility is created of implementing the functions and required processes for such a method subsequently via a corresponding interface. In principle, the interface itself can also be implemented in the communication system, but can itself also be created only within the context of a secured software update. This results in an exceptionally high degree of flexibility of the possible method. Although it is currently known that currently standard asymmetrical methods for securing data will not be post-quantum resistant, symmetrical methods are likely to be, in particular if they have a sufficiently high key length. The problem is that symmetrical methods are not flexible enough with regard to key distribution and key negotiation, and cannot currently be used efficiently to secure communication between a large number of heterogeneous participants, as is required in a vehicle ecosystem. These symmetrical methods, expected to be post-quantum resistant, can thus be used only for individual particularly important data items and processes. It is expected, however, that in the future there will be suitable and sufficiently secure post-quantum-resistant methods and protocols, which fulfil all requirements, in particular with regard to such an efficient key distribution and key negotiation, and are also suitable for large systems with a large number of heterogeneous participants. For example, a kind of post-quantum-resistant asymmetrical cryptography. The possibility of reacting to future developments in the communication systems already currently installed in vehicles is created by the method according to the invention as it is possible to switch to a second post-quantum-resistant securing method in a secure manner when required at a later point in time.

It is further the case that key material required exclusively for use in the second securing method is also in principle introduced into the communication system initially and can be securely stored there. It can also, and this is the particular advantage of the method according to the invention, be implemented subsequently, however, for which purpose a further interface is used. Unlike the interface previously described, to implement the methods and processes, this further interface that serves to implement the required key material for securing the communication in a post-quantum-resistant manner is encrypted cryptographically. For the other previously described interface, security protected by integrity and authenticity is sufficient. For the further interface, via which the key material required for the method implemented via the other interface is transmitted, an encryption is necessary to guarantee the confidentiality of the key material in every instance.

The initially introduced key material can in principle also be a kind of "base secret" for the two securing methods which is correspondingly retained. From the latter, the required "specific secrets" for the respective securing method can be derived as required such that they can then be used exclusively in the respective case.

According to a very favorable embodiment, however, it can also be provided that the initially introduced key material is provided for exclusive use in the second securing method.

A further very favorable embodiment of the method according to the invention provides another further interface, which is used to deactivate or to delete the functions of the first non-post-quantum-resistant securing method. This other further interface can thus correspondingly deactivate or switch off the functions and optionally delete them, whereby these functions are deactivated in any case.

The three interfaces described ultimately correspond to three different partial conditions that are substantially necessary as requirements for securely transitioning the communication system into the post-quantum era. It is correspondingly ensured via the other further interface that the conventional and non-post-quantum-resistant cryptographic methods used in the pre-quantum mode are no longer used by the communication system. It is possible to implement post-quantum-resistant cryptographic methods via the first specified interface. Via the further interface, which in the present enumeration thus forms a third interface so to speak, the key material is transmitted to the communication system in order to then provide the post-quantum-resistant method integrated via the second interface according to the enumeration with the necessary secret key material. It is thus correspondingly of high importance to cryptographically secure and encrypt the data optionally transmitted via the third interface in order to actually keep secret key material secret.

After the conventional and non-post-quantum-resistant methods and functions still used in the pre-quantum mode have been deactivated and/or deleted via the other further interface in the enumeration above, the second securing method, which has been implemented via the second interface and supplied with the required secret key material via the third interface, can then be correspondingly activated via another further fourth interface.

All the interfaces can and should be secured with cryptographic methods. It is substantially of no importance whether or not the methods are post-quantum-resistant if the interfaces are typically used to initiate the function of the communication system in the post-quantum mode before the introduction of the post-quantum threat, and thus these interfaces can typically also be sufficiently secured via pre-quantum-resistant methods alone.

It can be of particular advantage, in particular for the particularly vulnerable other third interface, which can be used to transmit the secret key material as required, and it can also be sensible to select a post-quantum-resistant method for cryptographically securing and in particular encrypting from the outset, for example a symmetrical encryption with sufficient key length. In this case, an initial secret needs to be stored in the communication system in a sufficiently secured manner.

In principle, such security can also be correspondingly used for the other interfaces, as considering the post-quantum threat, the security specified above and possible in principle with non-post-quantum-resistant methods does not enable Perfect Forward Secrecy (PFS). This means that an attacker can, for example, record communication data transmitted before the introduction of the post-quantum threat and secured with non-post-quantum-resistant methods, and is in the position to decrypt the data subsequently after the post-quantum threat has been introduced. To avoid this problem entirely, a method currently considered to be post-quantum resistant, such as symmetrical authentication and/or encryption with keys of sufficient key length, can be used for security from the outset. As the processes for changing the procedures in the communication system via the specified interfaces and/or their implementation itself and the implementation of new functions via the interfaces do not typically fall under mass communication that is otherwise common in vehicles, i.e., take place rarely and as a rule only once, the communications systems can, with reasonable effort, be equipped with key material required for securing these processes.

A further very favorable embodiment of the method according to the invention can further provide that the deactivation and/or deletion of the functions of the first securing method via the other further interface is irreversible. Such an irreversible deactivation or deletion ensures that at a later point in time at which the post-quantum threat will typically already have been introduced, the corresponding methods cannot be re-activated. In practice, this would specifically lead to the communication being secured with the pre-quantum-resistant methods again, and thus to said communication no longer being secure in the era after the post-quantum threat.

As already mentioned, in the event of the implementation of at least one of the interfaces, the communication should be equipped with the required key material. This can, but must not necessarily, occur initially. All that is crucial with regard to PFS is that the key material is introduced via the further third interface, and thus that the secret key material for post-quantum operation is introduced exclusively with post-quantum-resistant cryptographic encryption.

A very favorable embodiment of the method according to the invention can further provide that the possibility is provided for each of the interfaces of securely marking a process as the last possible process of its kind. This possibility should be designed such that the changes made up to that point, including this last marked process, become irreversible with regard to the respective interface. This too ultimately serves to prevent functions altered via the respective interfaces, which ultimately prevents the switch from the pre-quantum mode into the post-quantum mode from being reversed.

To better secure the method according to the invention, according to an exceptionally favorable development of this method, it can be provided that a dedicated secured update interface is provided for each of the interfaces that can be implemented via a software update. This dedicated update interface for the software update, for example secured in terms of integrity and authentication, ensures, for example, that the corresponding functions are also correspondingly secured if they are only integrated into the communication system in the course of the "life" of the latter. According to a very favorable embodiment, the individual update interfaces for the software update can also provide the possibility of securely marking a process as the last possible process, such that here too it is guaranteed that the changes made up to that point with regard to the interface become irreversible.

Further advantageous embodiments of the method according to the invention also result from the exemplary embodiment, which is described in the following with reference to the figures.

BRIEF DESCRIPTION OF THE DRAWING FIGURES

Figure 2:
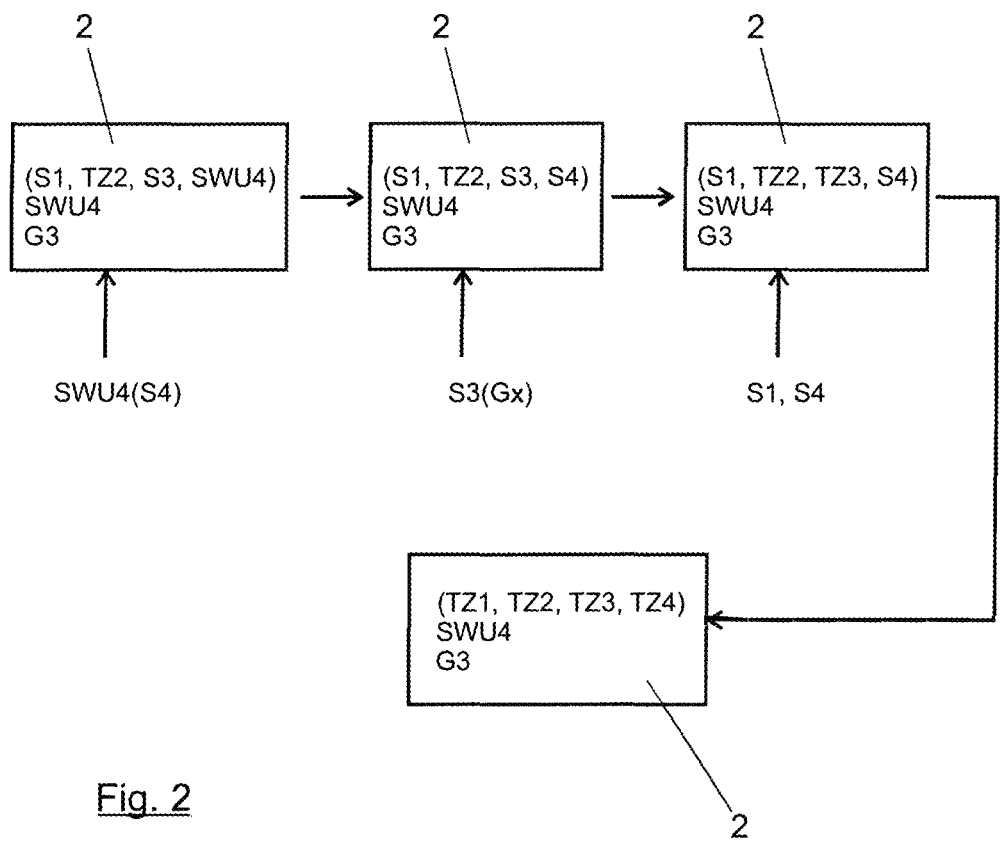

Here:

FIG. 1 shows a basic communication scenario between a vehicle and a vehicle-external server; and FIG. 2 shows a schematic depiction of the transition of a communication system of the vehicle from a non-post-quantum-resistant into a post-quantum-resistant mode.

DETAILED DESCRIPTION

As specified in the introduction, it is typically the case that modern vehicles are part of a large vehicle ecosystem. They communicate with a vehicle-external server, the so-called backend.

In the depiction of FIG. 1, a vehicle 1 having a schematically depicted communication system 2 that communicates with a vehicle-external server in the form of the backend 3 is shown. This communication between the communication system 2 of the vehicle 1 and the backend 3 serves for the exchange of different data, for example for controlling the driving dynamics, for controlling navigation systems, for implementing software updates and/or for using numerous systems and devices in the vehicle 1 that have stored parts of their functionalities realized via software on the backend 3. The data exchanged here underlies different requirements with regard to security. It can, for example, be correspondingly critical for driving safety, such that it must be reliably protected. For this purpose, cryptographic methods can be used for authentication, encryption, and/or identity protection. For other data, encryption is particularly important, for example, to protect the privacy of the user of the vehicle 1, and for other data such as software updates or the like, it is particularly crucial that a reliable authentication is given, such that the systems in the vehicle 1 can rely on the fact that the software update is made available from a correspondingly authorized and trustworthy location, such as the backend 3.

To ensure that the communication system, which is currently secured with non-post-quantum-resistant methods, also remains secure after the introduction of the post-quantum-resistant threat described in the introduction and that all its functions can still be used, security with post-quantum-resistant methods is targeted at a future point in time. So that the communication system 2 can be securely operated in such a post-quantum mode, the following four requirements must primarily be fulfilled:

1. It is ensured that the conventional non-post-quantum-resistant cryptographic methods used in the pre-quantum mode in the first securing method are no longer used by the communication system 2.
2. Implementations of post-quantum-resistant cryptographic methods are present in the communication system 2.
3. The key material required for the use of the implemented post-quantum-resistant cryptographic methods is present in the communication system 2.
4. The post-quantum-resistant cryptographic methods implemented in the communication system 2 and the associated key material are used by the communication system 2 to secure it, e.g., to protect the communication with the vehicle-external backend 3.

These four requirements correspond to four partial states (TZ1 to TZ4) in which the communication system 2 must be in order to be protected in a post-quantum-resistant manner.

The communication system 2 is considered to be in the partial state TZi precisely if the requirement or condition i. is fulfilled.

FIG. 2 shows different states of the communication system 2 having the partial states TZi given therein and further parameters yet to be explained. Only in the state (TZ1, TZ2, TZ3, TZ4) depicted in the second row is the communication system 2 post-quantum-resistant.

The four partial states TZi are not independent of one another. In particular, the partial states TZ2 (the presence of implementations of post-quantum-resistant methods) and TZ3 (the presence of associated (secret) key material) are conditions for the partial state TZ4 (the use of post-quantum-resistant methods). This means that the communication system 2 must first be set to the partial states TZ2 and TZ3 before it can be set to the partial state TZ4. Logically, the communication system 2 should also be in the partial state TZ1 (the non-use or deactivation of conventional non-post-quantum-resistant methods) before it can be set to the partial state TZ4. By contrast, the partial states TZ1, TZ2 and TZ3 are dependent on one another, the communication system 2 can be set to these partial states in any order.

The communication system 2 can come to be in each of the four partial states TZ1, TZ2, TZ3, TZ4 in one of two ways. On the one hand, it can already be in this partial state on delivery. On the other hand, it can be set to this partial state TZ1, TZ2, TZ3, TZ4 in a secure manner during operation, e.g., via a remote function or in the workshop. For this purpose, the communication system 2 must be equipped with suitable interfaces S1, S2, S3, S4, using which the state transition can be implemented. To prevent misuse of these interfaces S1, S2, S3, S4, they must be correspondingly protected or secured.

If the communication system 2 is already in a particular partial state TZ1, TZ2, TZ3, TZ4 on delivery, then no interface S1, S2, S3, S4 is required with which it can be set to this partial state TZ1, TZ2, TZ3, TZ4. If, for example, implementations of post-quantum-resistant methods are present in the communication system 2 from the outset, then they do not have to be introduced into the communication system 2 in retrospect. If they are not present, a corresponding interface S2 is required that enables a secure introduction of these implementations into the communication systems 2 already delivered and located in the field. In one extreme case, the communication system 2 is in none of the partial states TZ1, TZ2, TZ3, TZ4 on delivery. This means that it requires interfaces S1, S2, S3, S4 to switch off the non-post-quantum-resistant methods securely, to provide the communication system 2 with implementations of post-quantum-resistant methods and associated key material, and then to switch on these implementations for use. In the other extreme case, all partial states TZ1, TZ2, TZ3, TZ4 are already fulfilled in the communication system 2 on delivery. All four of the above requirements would thus be given, and the communication system 2 would be protected in a post-quantum-resistant manner from the outset. None of the interfaces S1, S2, S3, S4 and no actions to become post-quantum-resistant in the future are then required.

Each of these four interfaces S1, S2, S3, S4, as long as they are required and present, must be secured against misuse. The four interfaces S1, S2, S3, S4 have different protection requirements. For the interfaces S1, S2 and S4, the integrity of the data or the authenticity of the user of these interfaces S1, S2 and S4 plays a central role, e.g., the integrity of the implementations of the post-quantum-resistant methods transmitted when using the interface S2. By contrast, the confidentiality of the data, e.g., the confidentiality of the implementations of post-quantum-resistant methods introduced into the communication system 2 via the interface S2, is of relatively little importance. For the interface S3 for introducing key material for post-quantum-resistant methods, however, both the integrity/authenticity and the confidentiality of the data, and thus here of the key material, is decisively important.

Securing the interfaces S1, S2, S3, S4 can be undertaken both using conventional non-post-quantum-resistant methods and using post-quantum-resistant methods, has already been described above and proven with examples.

In comparison with security with post-quantum-resistant methods, securing one of the four interfaces using non-post-quantum-resistant methods is less secure for two reasons.

1. An interface secured with non-post-quantum-resistant methods can no longer be securely used after the introduction of the post-quantum threat.
2. Considering the post-quantum threat, security with non-post-quantum-resistant methods does not offer Perfect Forward Secrecy (PFS). This means that should an attacker, for example, record the communication secured with non-post-quantum-resistant methods that has taken place before the introduction of the post-quantum threat, they are retrospectively, i.e., after the introduction of the post-quantum threat, sometimes in the position to indistinguishably authenticate any freely selected dedicated data for the receiver and to decrypt encrypted content.

The effect of the first weakness can be avoided if the respective interface S1, S2, S3, S4 secured with non-post-quantum-resistant methods is used exclusively before the introduction of the post-quantum threat, and thus if, using the interface, the communication system 2 is transitioned into the corresponding partial state TZ1, TZ2, TZ3, TZ4, and thus securely into the second securing method for the post-quantum mode, before the introduction of the post-quantum threat. Here it must be ensured that none of the interfaces S1, S2, S3, S4 can be used to reverse this transition. This applies in particular in the case of the interface S1 that deactivates the non-post-quantum-resistant methods in the communication system 2, which can be ensured, for example, by implementing a secure irreversible post-quantum bit, analogous to the description in the older German patent application 10 2020 001 199.3 specified above, and thus, for example, with a write once memory (WOM) located in a secured hardware security module (HSM).

The second weakness has different effects on the individual interfaces S1, S2, S3, S4. As already specified above, the interfaces S1, S2 and S4 have a high integrity and authenticity requirement, but a low confidentiality requirement. This means that as long as it is ensured that transitions into the partial states TZ1, TZ2 and TZ4 via interfaces S1, S2 and/or S4 secured by non-post-quantum-resistant methods undertaken before the introduction of the post-quantum threat cannot be reversed by interfaces S1, S2 and/or S4 secured with non-post-quantum-resistant methods after the introduction of the post-quantum threat, for example by the interfaces, the state transitions undertaken before the introduction of the post-quantum threat are secure even if they were secured with non-post-quantum-resistant methods. This can be achieved, for example, by the interfaces S1, S2, S4 being deactivated before the introduction of the post-quantum threat. The switch to post-quantum-resistant security of the interfaces S1, S2, and/or S4 is thus unnecessary as long as they are used exclusively before the introduction of the post-quantum threat, and thus an irreversible transition into the partial states TZ1, TZ2, and TZ4 is already undertaken before the introduction of the post-quantum threat.

By contrast, the interface S3, which serves to introduce the new key material into the communication system 2, additionally has a high confidentiality requirement. This means that transmissions with non-post-quantum-resistant methods of encrypted data recorded "in advance" could possibly be decrypted by an attacker after the introduction of the post-quantum threat. Although it is complex and expensive to record encrypted exchanged messages that cannot be decrypted at the time of recording, this cannot be ruled out. Initially securing the interface S3 exclusively with post-quantum-resistant methods thus offers increased security in comparison with initially securing said interface with non-post-quantum-resistant methods, even if the interface S3 is only intended to be used before the introduction of the post-quantum threat. If an interface S1, S2, S3, S4 is to be operated securely with the same cryptographic methods before and after the introduction of the post-quantum threat, it must be secured from the outset, and thus on delivery of the communication system 2, with post-quantum-resistant methods, e.g., exclusively symmetrical methods having sufficiently long keys.

The individual interfaces S1, S2, S3, S4 need not either all be protected with non-post-quantum-resistant methods or all be secured with post-quantum-resistant methods, instead, each interface can be individually protected with non-post-quantum-resistant or post-quantum-resistant methods. Depending on the nature of the protection, it can be securely used either only before the introduction of the post-quantum threat or afterwards too.

Depending on the cryptographic methods used, at the point of use of each of the interfaces S1, S2, S3, S4, the communication system 2 must have the cryptographic material required for the protection of said interfaces.

Each of the four interfaces S1, S2, S3, S4 is implemented at least in large part in software. This means that each of these interfaces S1, S2, S3, S4 can thus have already been implemented in the communication system 2 before the latter is put into operation or, alternatively, they can be set up in the communication system 2 subsequently, during operation, using a general software update interface, either as a remote update via the backend 3 for example or, e.g., in a workshop.

A pre-requisite for the use of a software update interface SWU to introduce one or several interfaces S1, S2, S3, S4 into the communication system 2 is that the software update interface SWU used also supports the introduction of the respective interfaces S1, S2, S3, S4, which can make relatively significant interventions in the communication system 2. The individual interfaces S1, S2, S3, S4 can, in particular, be hardware-related, which are mostly unchanged in general practice and can be very closely connected to the hardware structure of the communication system 2 used. Purely for this reason, it is logical to provide a dedicated software update interface SWU1, SWU2, SWU3, SWU4 for each interface S1, S2, S3, S4 which may be implemented by a software update subsequently.

Such a software update interface SWU must in turn be secured against misuse, wherein non-post-quantum-resistant or post-quantum-resistant methods can be used in turn. As no particularly high confidentiality requirement exists when using the software update interface SWU and the priority is unambiguously the integrity and authenticity of the data, a software update interface SWU secured with non-post-quantum-resistant methods can securely be used to introduce implementations of the interfaces S1 to S4, analogously to the interfaces S1, S2, and S4, as long as this introduction is undertaken before the introduction of the post-quantum threat and the respective software update interface SWU is deactivated before the introduction of the post-quantum threat.

Here too, the kinds of security, i.e., non-post-quantum-resistant or post-quantum-resistant, of the software update interface SWU and the interfaces S1, S2, S3, S4 are independent of one another and can be combined in any way. This means, for example, that the software update interface SWU can be secured in a non-post-quantum-resistant manner and one of the interfaces S1, S2, S3, S4 can be secured in a post-quantum-resistant manner. Here it must logically always be taken into account that interfaces secured with non-post-quantum-resistant methods can no longer be securely used after the introduction of the post-quantum threat. Preferably, each of the interfaces S1, S2, S3, S4 to be introduced via a software update has a dedicated software update interface SWU1, SWU2, SWU3, SWU4 conceived and secured for the respective interface, as indicated in FIG. 2.

If the software update interface SWU or one of the interfaces S2, S3, S4 is secured with non-post-quantum-resistant methods and if the communication system 2 is in the partial state TZ1 that suppresses the use of non-post-quantum-resistant methods, these interfaces can no longer be used. This must be taken into account in the sequence of the introduction of the interfaces S2, S3, S4 into the communication system 2 by means of the software update interface SWU and calling up the interfaces S1, S2, S3, S4 and, in connection with the latter, the communication system 2 being set to the partial states TZ1, TZ2, TZ3, TZ4.

The cryptographic methods used to secure the software update interface SWU or the interfaces S1, S2, S3, S4 require suitable key material. If the focus of an interface SWU, S1, S2, S4 is on the integrity and/or the authenticity of the data introduced into the communication system 2, it is sufficient, in the event that conventional asymmetrical methods (digital signature) are used to check the methods in the communication system 2, to equip the latter with non-confidential key material (public keys, certificates). These can be securely introduced into the communication system 2 initially, but also at any time later via interfaces that are not confidentially protected, such as the software update interfaces SWU. The interface S3, however, requires confidentiality, to produce which initial equipment of the communication system 2 with secret key material G3 is non-negotiable.

In the depiction of FIG. 2, as already specified above, the communication system 2 is depicted multiple times in different states, and connected via the corresponding arrows that represent the state transitions. The three upper depictions of the communication system 2 show the latter in the not yet post-quantum-resistant operation, the depiction below then shows it in the post-quantum-resistant operation after this has been attained.

In the top left depiction, the different states and interfaces are correspondingly depicted within the communication system 2 in the bracket. S1 corresponds to the first interface, TZ2 means that the second partial state has already been attained, and thus that post-quantum-resistant methods are, in principle, ready. The interface 3 is likewise present, the interface S4, for producing the partial state TZ4, is missing. In addition, however, the communication system has the software update interface SWU4, i.e., the software update interface for the interface S4, initially implemented. The communication system 2 additionally comprises, for example, the secret G3, securely stored initially, in a manner secure against manipulation and against being read, in the communication system 2, and thus, for example, stored in an HSM, the secret G3 being required as an initially stored secret G3 for communication via the interface S3. The arrow coming from below shows the use of the software update interface SWU4(S4) for the implementation of the interface S4.

The software update interface SWU4 already present initially is therefore now actively used. In the following state, which is shown by the middle depiction of the communication system 2, the interface S4 is then correspondingly installed. The change carried out could now be made irreversible by the software update interface SWU4 being deactivated or deleted, but this has not taken place here, and the current implementation S4 could thus still be overwritten in future using SWU4. The current implementation S4 is therefore still respectively depicted in the following variants.

Using the initial secret G3, the additional secret required exclusively for the post-quantum mode, here corresponding to Gx, can be correspondingly downloaded via the interface S3 already present, for which purpose the interface S3 guarantees the conditions already specified several times regarding authenticity, integrity, and in particular, confidentiality due to the secret G3, and for example a symmetrical encryption with a sufficiently long key. After this step, the interfaces S1 and S4 and the partial states TZ2 and TZ3 are present in the communication system 2 in the state depicted at the top right. By using the interface S1 to switch off the non-post-quantum-resistant methods and protocols that are not yet post-quantum-resistant, and thus the first securing method, indicated in this step, and switching on the second post-quantum-resistant securing method by means of the interface S4, the partial states TZ1 and TZ4 are now also correspondingly fulfilled. This state of the communication system 2 having all the fulfilled partial states TZ1, TZ2, TZ3 and TZ4 can be seen below in the depiction in FIG. 2. In this state, the communication system 2 has been securely transitioned into a post-quantum-resistant operating mode via the method according to the invention.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for securing communication between a communication system of a vehicle and a vehicle-external server via a communication interface, the communication interface being secured such that data is transmittable to the communication system in a manner that protects its integrity and authenticity, the method comprising:
implementing a first securing method for non-post-quantum-resistant securing of exchanged data in the communication system via the communication interface;
implementing a second securing method for post-quantum-resistant securing of exchanged data in the communication system via the communication interface, implementing the second securing method for post-quantum-resistant securing of exchanged data in the communication system via another interface implemented in the communication system, or implementing the second securing method for post-quantum-resistant securing of exchanged data in the communication system via a software update; and
introducing key material for use in the second securing method via a further interface, wherein the further interface is implemented in the communication system or is implemented via a software update, wherein the introduced key material is received in a cryptographically encrypted manner and is securely stored for exclusive use in the second securing method, wherein the key material is introduced via the further interface with symmetrical cryptographic encryption.

2. The method of claim 1, further comprising:
deactivating or deleting functions of the first securing method in event of introduction of the post-quantum threat by another further interface.

3. The method of claim 1, wherein in the event of the introduction of the post-quantum threat, the second securing method is activated by another further fourth interface to exclusively secure data exchanged via the communication interface.

4. The method of claim 2, wherein the deactivation or deletion of the functions of the first securing method via the other further interface is irreversible.

5. The method of claim 1, wherein the communication system is equipped with required key material to implement the another interface or the further interface.

6. The method of claim 5, wherein the equipping of the communication the equipment occurs initially.

7. The method of claim 2, further comprising:
securely marking a process as the last possible process of one of the another interface, the further interface, or the another further interface such that changes made up to that point regarding the another interface, the further interface, or the another further interface become irreversible.

8. The method of claim 2, wherein a dedicated secured software update interface is provided for each of the another interface, the further interface, and the another further interface that is implementable via a software update.

9. The method of claim 8, further comprising:
securely marking a process as the last possible process of at least one of the software update interfaces such that changes made up to that point regarding the software update interface become irreversible.

* * * * *